United States Patent
Zhou

(10) Patent No.: US 11,543,299 B2
(45) Date of Patent: Jan. 3, 2023

(54) METHOD, APPARATUS, TOUCH CHIP AND ELECTRONIC DEVICE FOR DETERMINING TEMPERATURE STATUS OF TOUCH SCREEN

(71) Applicant: SHENZHEN GOODIX TECHNOLOGY CO., LTD., Shenzhen (CN)

(72) Inventor: Wei Zhou, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 303 days.

(21) Appl. No.: 16/817,790

(22) Filed: Mar. 13, 2020

(65) Prior Publication Data

US 2020/0232855 A1 Jul. 23, 2020

Related U.S. Application Data

(63) Continuation of application No. PCT/CN2019/072306, filed on Jan. 18, 2019.

(51) Int. Cl.
| | |
|---|---|
| G01K 3/00 | (2006.01) |
| G01K 3/06 | (2006.01) |
| G01K 7/34 | (2006.01) |

(52) U.S. Cl.
CPC .............. *G01K 3/06* (2013.01); *G01K 7/34* (2013.01)

(58) Field of Classification Search
CPC combination set(s) only.
See application file for complete search history.

(56) References Cited

U.S. PATENT DOCUMENTS

| | | | |
|---|---|---|---|
| 2012/0056851 A1* | 3/2012 | Chen | G06F 3/0418 345/173 |
| 2013/0124140 A1* | 5/2013 | Jang | G06F 3/0446 702/150 |
| 2015/0280708 A1 | 10/2015 | Goto et al. | |
| 2016/0054825 A1 | 2/2016 | Fried | |

(Continued)

FOREIGN PATENT DOCUMENTS

| | | |
|---|---|---|
| CN | 102968217 A | 3/2013 |
| CN | 104866140 A | 8/2015 |

(Continued)

*Primary Examiner* — Lisa M Caputo
*Assistant Examiner* — Nasir U. Ahmed
(74) *Attorney, Agent, or Firm* — Emerson, Thomson & Bennett, LLC; Roger D. Emerson; Warren A. Rosborough

(57) ABSTRACT

A method, apparatus, touch chip, and electronic device for determining a temperature status of a touch screen. The method for determining a temperature status of a touch screen includes: determining, based on a plurality of sampled characteristic values of each temperature monitoring node in each sampling period, a raw characteristic value of the temperature monitoring node in a the sampling period, the temperature monitoring being selected from a plurality of capacitance nodes in a touch array; and calculating, based on raw characteristic values of all temperature monitoring nodes in each sampling period, a raw characteristic statistic value in each sampling period, and determining the temperature status of the touch screen based on a raw characteristic statistic values in sampling periods.

18 Claims, 7 Drawing Sheets

(56) References Cited

U.S. PATENT DOCUMENTS

2017/0242505 A1* 8/2017 Vandermeijden ........ G01K 3/14
2019/0018543 A1* 1/2019 Yang ..................... G06F 3/0418

FOREIGN PATENT DOCUMENTS

| CN | 104951087 A | 9/2015 | |
|---|---|---|---|
| CN | 106681627 A | 5/2017 | |
| CN | 107092385 A | 8/2017 | |
| CN | 109643200 A | 4/2019 | |
| EP | 3106970 A1 | 12/2016 | |
| WO | WO-2019006667 A1 * | 1/2019 | ............. G01K 13/00 |

* cited by examiner

| No. | raw data | | | | | | | | | | | | |
|---|---|---|---|---|---|---|---|---|---|---|---|---|---|
| 12186 | 12352 | 12375 | 12419 | 12414 | 12445 | 12470 | 12757 | 12805 | 12857 | 12900 | 12858 | 12931 | 13289 |
| 12367 | 12456 | 12493 | 12589 | 12635 | 12689 | 12729 | 12973 | 12955 | 13053 | 13142 | 13086 | 13133 | 13395 |
| 12265 | 12428 | 12520 | 12603 | 12607 | 12663 | 12770 | 12992 | 12989 | 13092 | 13126 | 13064 | 13081 | 13311 |
| 12385 | 12533 | 12579 | 12660 | 12612 | 12658 | 12707 | 12984 | 13094 | 13173 | 13225 | 13176 | 13177 | 13405 |
| 12367 | 12557 | 12611 | 12654 | 12711 | 12690 | 12685 | 12916 | 12929 | 12966 | 13021 | 13027 | 13093 | 13365 |
| 12391 | 12583 | 12642 | 12578 | 13680 | 12738 | 12736 | 13011 | 13051 | 13084 | 13110 | 13031 | 13102 | 13363 |
| 12345 | 12531 | 12573 | 12631 | 12626 | 12656 | 12719 | 12941 | 12976 | 13010 | 13064 | 12989 | 13060 | 13339 |
| 12420 | 12603 | 12645 | 12630 | 12691 | 12721 | 12739 | 12969 | 12968 | 13012 | 13067 | 13064 | 13146 | 13322 |
| 12402 | 12589 | 12618 | 12663 | 12643 | 12673 | 12712 | 13008 | 12986 | 13046 | 13105 | 13043 | 13102 | 13524 |
| 12477 | 12662 | 12711 | 12740 | 12730 | 12758 | 12788 | 13044 | 13096 | 13107 | 13158 | 13109 | 13388 | 13470 |
| 12382 | 12560 | 12598 | 12636 | 12645 | 12661 | 12685 | 12950 | 12974 | 13052 | 13062 | 13023 | 13385 | 13354 |
| 12482 | 12651 | 12687 | 12729 | 12740 | 12772 | 12793 | 13053 | 13073 | 13127 | 13193 | 13116 | 13165 | 13567 |
| 12941 | 12794 | 12793 | 12769 | 12746 | 12735 | 12720 | 12979 | 12943 | 12979 | 12906 | 12839 | 12829 | 12504 |
| 13044 | 12949 | 12946 | 12950 | 12912 | 12913 | 12898 | 13120 | 13117 | 13549 | 13118 | 12992 | 12990 | 12688 |
| 13031 | 12961 | 12978 | 12963 | 12924 | 12916 | 12899 | 13114 | 13107 | 13204 | 13523 | 13021 | 13006 | 12667 |
| 13225 | 13209 | 13279 | 13286 | 13247 | 13217 | 13211 | 13456 | 13454 | 13450 | 13632 | 13359 | 13362 | 12989 |
| 13461 | 13426 | 13422 | 13429 | 13361 | 13332 | 13314 | 13530 | 13539 | 13522 | 13541 | 13429 | 13439 | 13099 |
| 13484 | 13451 | 13455 | 13432 | 13371 | 13346 | 13321 | 13583 | 13585 | 13597 | 13605 | 13509 | 13509 | 13182 |
| 13685 | 13649 | 13642 | 13624 | 13586 | 13580 | 13568 | 13827 | 13812 | 13837 | 13823 | 13729 | 13750 | 13397 |
| 13649 | 13631 | 13609 | 13596 | 13564 | 13560 | 13548 | 13788 | 13789 | 13792 | 13795 | 13714 | 13712 | 13367 |
| 13822 | 13801 | 13781 | 13765 | 13742 | 13733 | 13715 | 13866 | 13853 | 13857 | 13861 | 13851 | 13854 | 13546 |
| 14002 | 13992 | 13989 | 13994 | 13945 | 13925 | 13938 | 14180 | 14158 | 14162 | 14171 | 14265 | 14068 | 13766 |
| 14024 | 14030 | 14008 | 14015 | 13977 | 13979 | 13986 | 14234 | 14204 | 14213 | 14206 | 14467 | 14129 | 13829 |
| 13867 | 13869 | 13834 | 13857 | 13854 | 13883 | 13879 | 14106 | 14091 | 14085 | 14049 | 13974 | 13974 | 13704 |

METHOD, APPARATUS, TOUCH CHIP AND ELECTRONIC DEVICE FOR DETERMINING TEMPERATURE STATUS OF TOUCH SCREEN

CROSS-REFERENCE TO RELATED APPLICATION

The present disclosure is a continuation of international application No. PCT/CN2019/072306, filed on Jan. 18, 2019, which is hereby incorporated by reference in its entirety.

TECHNICAL FIELD

Embodiments of the present disclosure relate to the field of touch technology, and specifically to a method, an apparatus, a touch chip, and an electronic device for determining a temperature status of a touch screen.

BACKGROUND

As human-computer interface technology develops, touch technology has been widely used for its comfort and convenience in operation. In specific applications, requirements differ for touch performance in different application scenarios. However, due to the different application scenarios, a touch screen is affected by different degrees of environmental interference, which causes its touch performance to be greatly affected. For example, due to changes in the ambient temperature, upper capacitance nodes of the touch screen are inconsistently affected by the temperature. As a result, the characteristic values output by some capacitance nodes can be detected, and coordinate data obtained based on these characteristic values may be reported to the host. However, in fact, positions of these capacitance nodes on the touch screen are not actually touched by fingers or touched or approached by other objects that cause changes in the electric field.

It can be seen that due to the affect of temperature changes, the above-mentioned false report point situation (also known as a pop-up point phenomenon) may occur. Similarly, for example, there may be actually touch or approach but the coordinate data is not reported (also known as a disappearing point phenomenon), which causes the normal touch control logic to be disturbed, and eventually leads to a poor user experience.

SUMMARY

In view of this, one of the technical problems addressed by embodiments of the present disclosure is to provide a method, an apparatus, a touch chip, and an electronic device for determining a temperature status of a touch screen to overcome the above defects in the prior art.

An embodiment of the present disclosure provides a method for determining a temperature status of a touch screen, including:

determining, based on a plurality of sampled characteristic values of each temperature monitoring node in each sampling period, a raw characteristic value of the temperature monitoring node in the sampling period, the temperature monitoring being selected from a plurality of of capacitance nodes in a touch array; and calculating, based on raw characteristic values of all temperature monitoring nodes in each sampling period, a raw characteristic statistic value in each sampling period, and determining the temperature status of the touch screen based on raw characteristic statistic values in sampling periods.

Alternatively, in any embodiment of the present disclosure, the calculating, based on a plurality of sampled characteristic values of each temperature monitoring node in each sampling period, a raw characteristic value of the temperature monitoring node in the sampling period, includes: summing the plurality of sampled characteristic values of each temperature monitoring node in the sampling period to calculate the raw characteristic value of the temperature monitoring node in the sampling period.

Alternatively, in any embodiment of the present disclosure, the calculating, based on raw characteristic values of all temperature monitoring nodes in each sampling period, a raw characteristic statistic value in each sampling period, includes: preprocessing the raw characteristic values of all the temperature monitoring nodes in each sampling period, and obtaining the raw characteristic statistic value in each sampling period based on preprocessed raw characteristic values.

Alternatively, in any embodiment of the present disclosure, the preprocessing the raw characteristic values of all the temperature monitoring nodes in each sampling period, and obtaining the raw characteristic statistic value in each sampling period based on preprocessed raw characteristic values, includes:

performing differential processing on the raw characteristic values of each temperature monitoring node in adjacent sampling periods to obtain a raw characteristic value variation; and calculating, based on raw characteristic value variations of all the temperature monitoring nodes in each sampling period, the raw characteristic statistic value in the sampling period, and determining the temperature status of the touch screen based on raw characteristic statistic values in sampling periods.

Alternatively, in any embodiment of the present disclosure, the preprocessing the raw characteristic values of all the temperature monitoring nodes in each sampling period, and obtaining the raw characteristic statistic value in each sampling period based on preprocessed raw characteristic values, includes:

smoothing the raw characteristic value of each temperature monitoring node in each sampling period to obtain a smoothed raw characteristic value;

performing differential processing on the smoothed raw characteristic value of each temperature monitoring node in adjacent sampling period to obtain a smoothed raw characteristic value variation; and calculating, based on the raw characteristic value variation and the smoothed raw characteristic value variation of each temperature monitoring node in each sampling period, the raw characteristic statistic value in the sampling period.

Alternatively, in any embodiment of the present disclosure, the calculating, based on the raw characteristic value variation and the smoothed raw characteristic value variation of each temperature monitoring node in each sampling period, the raw characteristic statistic value in the sampling period, includes:

performing filtering processing on the smoothed raw characteristic value variation based on the raw characteristic value variation of each temperature monitoring node in the sampling period, to obtain a filtered raw characteristic variation; and calculating, based on filtered raw characteristic variations of all the temperature monitoring nodes in the sampling period, the raw characteristic statistic value in each sampling period.

Alternatively, in any embodiment of the present disclosure, the determining the temperature status of the touch screen based on the raw characteristic statistic values in the sampling periods, includes: when the number the raw characteristic statistic values in the sampling periods that are greater than a set first threshold is greater than a second threshold, and the maximum value in the raw characteristic statistic values is greater than a set third threshold, the touch screen is at a heating status.

Alternatively, in any embodiment of the present disclosure, the determining the temperature status of the touch screen based on the raw characteristic statistic values in the sampling period, includes: when the number of the raw characteristic statistic values in the sampling period less than a set fourth threshold is less than a set fifth threshold, and the minimum value in the raw characteristic statistic values is less than a set sixth threshold, the touch screen is at a cooling status.

Alternatively, in any embodiment of the present disclosure, the temperature monitoring node is selected from capacitance nodes located at a top left corner, a bottom left corner, a top right corner, or a bottom right corner of the touch array of the touch screen.

Alternatively, in any embodiment of the present disclosure, the temperature monitoring node located at the top left corner and the temperature monitoring node located at the bottom left corner correspond to different drive channels; the temperature monitoring node located at the top right corner and the temperature monitoring node located at the bottom right corner correspond to different drive channels; the temperature monitoring node located at the top left corner and the temperature monitoring node located at the top right corner correspond to different detection channels; and the temperature monitoring node located at the bottom left corner and the temperature monitoring node located at the bottom right corner correspond to different detection channels.

Alternatively, in any embodiment of the present disclosure, the temperature monitoring node is further selected from a capacitance node at a middle position of the touch array of the touch screen.

Alternatively, in any embodiment of the present disclosure, the temperature monitoring node located at the top left corner and the temperature monitoring node located at the bottom left corner correspond to the same drive channel; the temperature monitoring node located at the top right corner and the temperature monitoring node located at the bottom right corner correspond to the same drive channel; the temperature monitoring node located at the top left corner and the temperature monitoring node located at the top right corner correspond to the same detection channel; and the temperature monitoring node located at the bottom left corner and the temperature monitoring node located at the bottom right corner correspond to the same detection channel.

Alternatively, in any embodiment of the present disclosure, the temperature monitoring node is selected from capacitance nodes in a direction of a drive channel direction or a direction of a detection channel in the touch array of the touch screen.

An embodiment of the present disclosure provides an apparatus for determining a temperature status of a touch screen, including:

a characteristic value determining unit, configured to determine, based on a plurality of sampled characteristic values of each temperature monitoring node in each sampling period, a raw characteristic value of the temperature monitoring node in the sampling period, the temperature monitoring node being selected from a plurality of capacitance nodes in a touch array; and a temperature status determining unit, configured to calculate, based on raw characteristic values of all temperature monitoring nodes in each sampling period, a raw characteristic statistic value in each sampling period, and determine the temperature status of the touch screen based on raw characteristic statistic values in sampling periods.

An embodiment of the present disclosure provides a touch chip, including the apparatus for determining a temperature status of a touch screen according to any one of the embodiments of the present disclosure.

An embodiment of the present disclosure provides an electronic device, including the touch chip according to any one of the embodiments of the present disclosure.

In the technical solution provided by the embodiments of the present disclosure, by determining, based on a plurality of sampled characteristic values of each temperature monitoring node in each sampling period, a raw characteristic value of the temperature monitoring node in the sampling period, the temperature monitoring being selected from a a plurality of capacitance nodes in a touch array; then calculating, based on raw characteristic values of all temperature monitoring nodes in each sampling period, a raw characteristic statistic value in each sampling period, and determining the temperature status of the touch screen based on raw characteristic statistic values in sampling periods, therefore, according to the temperature status of the touch screen, the occurrence of abnormal situations such as disappearing points and pop-up points is avoided, and the normal touch control logic is further prevented from being disturbed.

BRIEF DESCRIPTION OF THE DRAWINGS

Hereinafter, some specific embodiments of the embodiments of the present disclosure will be described in detail by way of example rather than limiting with reference to the accompanying drawings. The same reference numerals in the accompanying drawings designate the same or similar components or parts. Those skilled in the art should appreciate that these accompanying drawings are not necessarily drawn to scale. In the accompanying drawings:

FIG. 1 is a schematic diagram of a first configuration of temperature monitoring nodes in an embodiment of the present disclosure;

FIG. 2 is a schematic diagram of a second configuration of temperature monitoring nodes in an embodiment of the present disclosure;

FIG. 3 is a schematic diagram of a third configuration of temperature monitoring nodes in an embodiment of the present disclosure;

FIG. 4 is a schematic diagram of a fourth configuration of temperature monitoring nodes in an embodiment of the present disclosure;

DETAILED DESCRIPTION OF EMBODIMENTS

Figure 5:
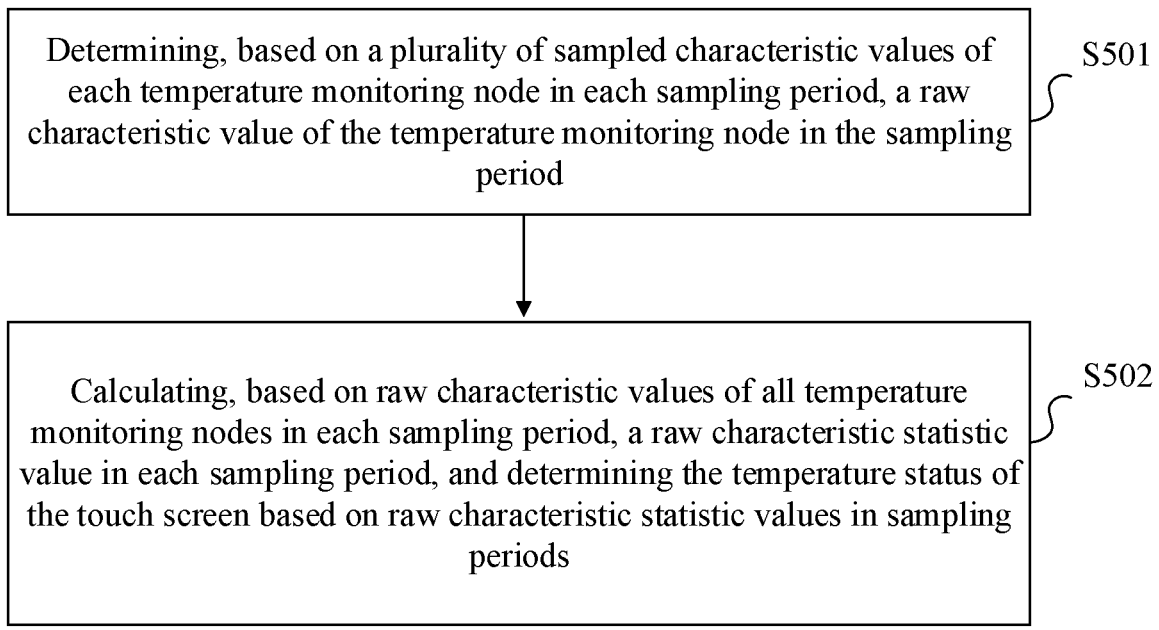
FIG. 5 is a schematic flowchart of a method for determining a temperature status of a touch screen according to an embodiment of the present disclosure.

In order to implement any technical solution of the embodiments of the present disclosure, it is not necessary to achieve all the above advantages at the same time.

The specific implementation of the embodiments of the present disclosure is further described below with reference to the accompanying drawings of the embodiments of the present disclosure.

In the technical solution provided by the embodiments of the present disclosure, by determining, based on a plurality of sampled characteristic values of each temperature monitoring node in each sampling period, a raw characteristic value of the temperature monitoring node in the sampling period, the temperature monitoring being selected from a plurality of capacitance nodes in a touch array; then calculating, based on raw characteristic values of all temperature monitoring nodes in each sampling period, a raw characteristic statistic value in each sampling period, and determining the temperature status of the touch screen based on a raw characteristic statistic values in sampling periods, therefore, according to the temperature status of the touch screen, the occurrence of abnormal situations such as disappearing points and pop-up points is avoided, and the normal touch control logic is further prevented from being disturbed.

In the embodiments of the present disclosure, in order to determine the temperature status of the touch screen, a part of capacitance nodes are selected from the touch array of the touch screen as temperature monitoring nodes or configuration temperature monitoring nodes (temperature control nodes). By sampling the characteristic values of these temperature monitoring nodes, and then performing a series of subsequent analyses, the determination of the temperature status is finally achieved. The configuration of the temperature monitoring nodes is related to the application scenario of the touch screen. Therefore, in the following embodiments of the present disclosure, first, according to different application scenarios, four configuration examples of the temperature monitoring nodes are provided with reference to FIGS. 1-4. However, it should be noted that FIG. 1 to FIG. 4 are merely exemplary illustrations provided for the convenience of explaining the present disclosure, and it is not particularly limited that the configuration of the temperature monitoring nodes has only four cases.

Figure 1:
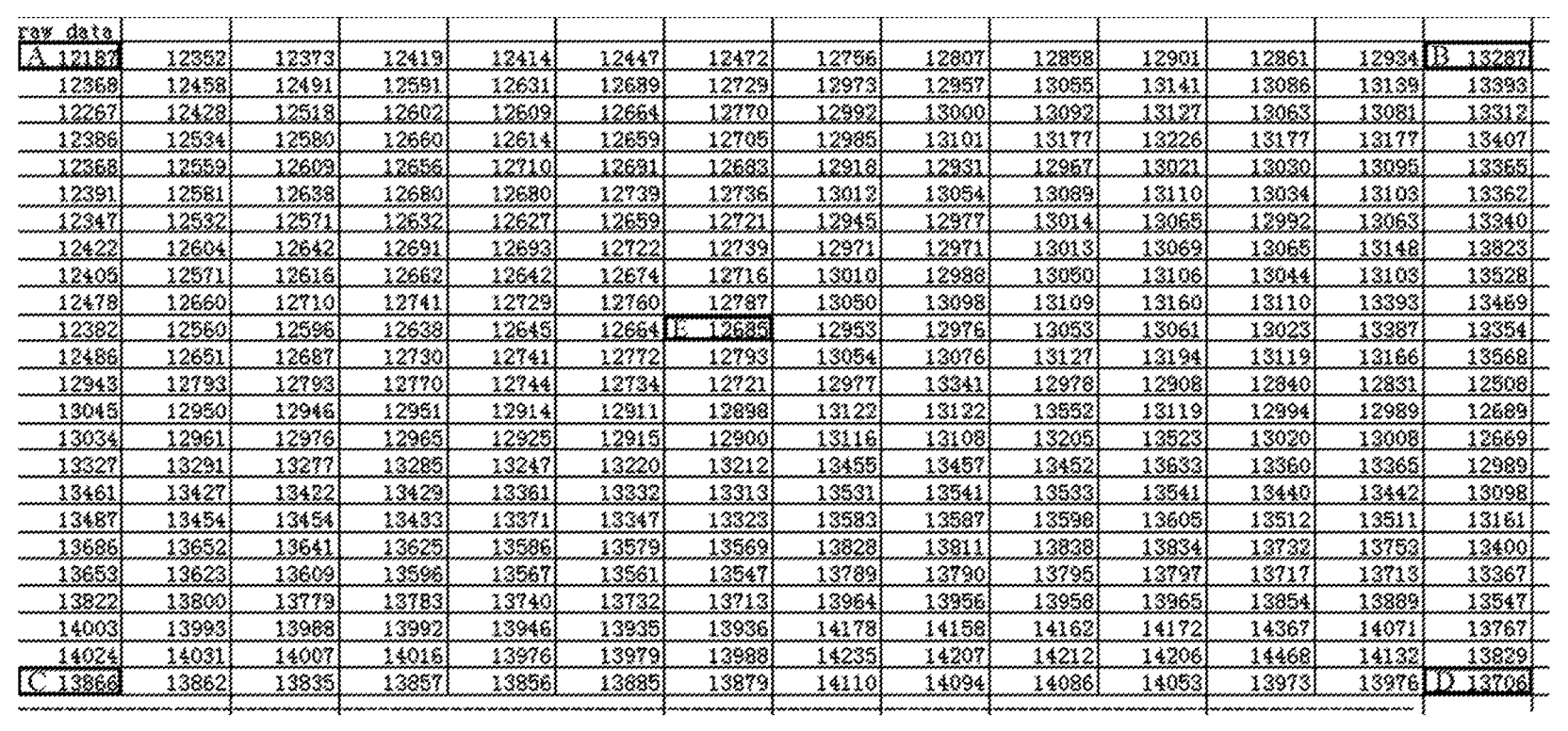

FIG. 1 is a schematic diagram of a first configuration of temperature monitoring nodes in an embodiment of the present disclosure; as shown in FIG. 1, in the present embodiment, the capacitance nodes located at the top left corner, the bottom left corner, the top right corner, the bottom right corner, and the middle position in the touch array of the touch screen are respectively used as the temperature monitoring nodes, and a total of 5 temperature monitoring nodes (A, B, C, D, E), or also the temperature monitoring node includes: a capacitance node selected from the touch array of the touch screen located at the top left corner, the bottom left corner, the top right corner, the bottom right corner and the middle position. The configuration of the temperature monitoring nodes in the present embodiment is applicable to the top left corner, the bottom left corner, the top right corner, and the bottom right corner of the touch screen, and may not be touched or approached by a user during operation, or during the normal operation of the user, there may not be too much edge touch, and the temperature monitoring node in the middle position may balance the consistency of a full-screen temperature change of the touch screen to ensure that the determination of a full-screen temperature status meets global characteristics.

If a drive channel is in the vertical direction and a detection channel is in the horizontal direction, the temperature monitoring node A located at the top left corner and the temperature monitoring node C located at the bottom left corner correspond to the same drive channel; the temperature monitoring node B located at the top right corner and the temperature monitoring node D located at the bottom right corner correspond to the same drive channel; the temperature monitoring node located at the top left corner and the temperature monitoring node located at the top right corner correspond to the same detection channel; and the temperature monitoring node located at the bottom left corner and the temperature monitoring node located at the bottom right corner correspond to the same detection channel.

It should be noted that, in a specific application, if the determination of the full-screen temperature status may be ignored and the global characteristics are met, the temperature monitoring node in the middle position may also be omitted.

In addition, it should be noted that, in a specific application, a number of temperature monitoring nodes may also be added on the basis of the above five temperature monitoring nodes. A plurality of temperature monitoring nodes located at the top left corner, the bottom left corner, the top right corner, the bottom right corner, and the middle position may form specific shapes, respectively.

Figure 2:
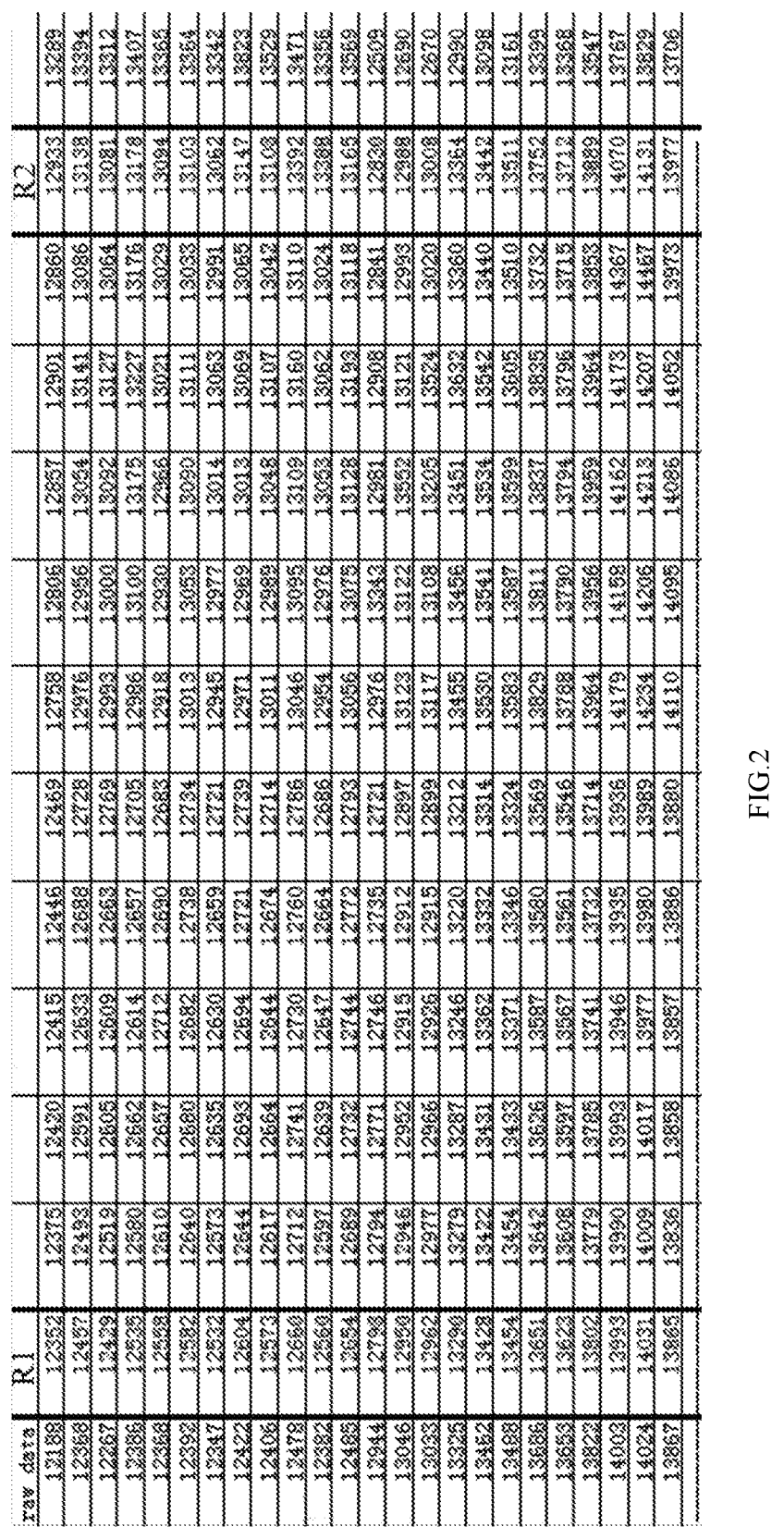

FIG. 2 is a schematic diagram of a second configuration of temperature monitoring nodes in an embodiment of the present disclosure; as shown in FIG. 2, a column of capacitance nodes in the left and right edges in the touch array of the touch screen are selected as the temperature monitoring nodes respectively; and if drive channels of the touch screen are arranged along the vertical direction, in the present embodiment, two columns of temperature monitoring nodes (R1, R2) are arranged along the direction of the drive channels. If the most marginal column of capacitance nodes is often touched, in the specific application, a column of capacitance nodes adjacent to the most marginal column of capacitance nodes may be used as the temperature monitoring nodes. The sampling of the characteristic values of the touch screen is sampled according to the driving direction. Therefore, when the temperature monitoring nodes are set along the direction of the drive channels, the collection of the characteristic values is fast, thereby improving the calculation efficiency of the data as a whole, which may be effectively applicable to application scenarios having high timeliness of data calculation.

It should be noted that, in a specific application, a number of columns of temperature monitoring nodes may be further added on the basis of the above two columns of temperature monitoring nodes.

In addition, in a specific application, part of the capacitance nodes may also be selected as the temperature monitoring nodes from the two columns of capacitance nodes respectively, thereby forming two columns of temperature monitoring nodes as a whole.

FIG. 3 is a schematic diagram of a third configuration of temperature monitoring nodes in an embodiment of the present disclosure; as shown in FIG. 3, a row of capacitance nodes on the top and bottom edges in the touch array of the touch screen are selected as the temperature monitoring nodes, respectively, and if detection channels of the touch screen are arranged along the horizontal direction, in the present embodiment, two rows of temperature monitoring nodes (L1, L2) are arranged along the direction of the detection channels, thus effectively avoiding LCD interference. If a row of capacitance nodes on the top and bottom edges is often touched and a column of capacitance nodes on the left and right edges is often touched, in the specific application, a row of capacitance nodes on the top and bottom edges may be first determined, and a column of capacitance nodes is shrunk in the direction of the column to eventually form two rows of temperature monitoring nodes, further effectively avoiding LCD interference and interference caused by frequent touch or approach on the edges.

It should be noted that, in a specific application, a number of rows of temperature monitoring nodes may be further added on the basis of the above two rows of temperature monitoring nodes.

In addition, in a specific application, part of the capacitance nodes may also be selected as the temperature monitoring nodes from the two rows of capacitance nodes respectively, thereby forming two rows of temperature monitoring nodes as a whole.

Figure 4:
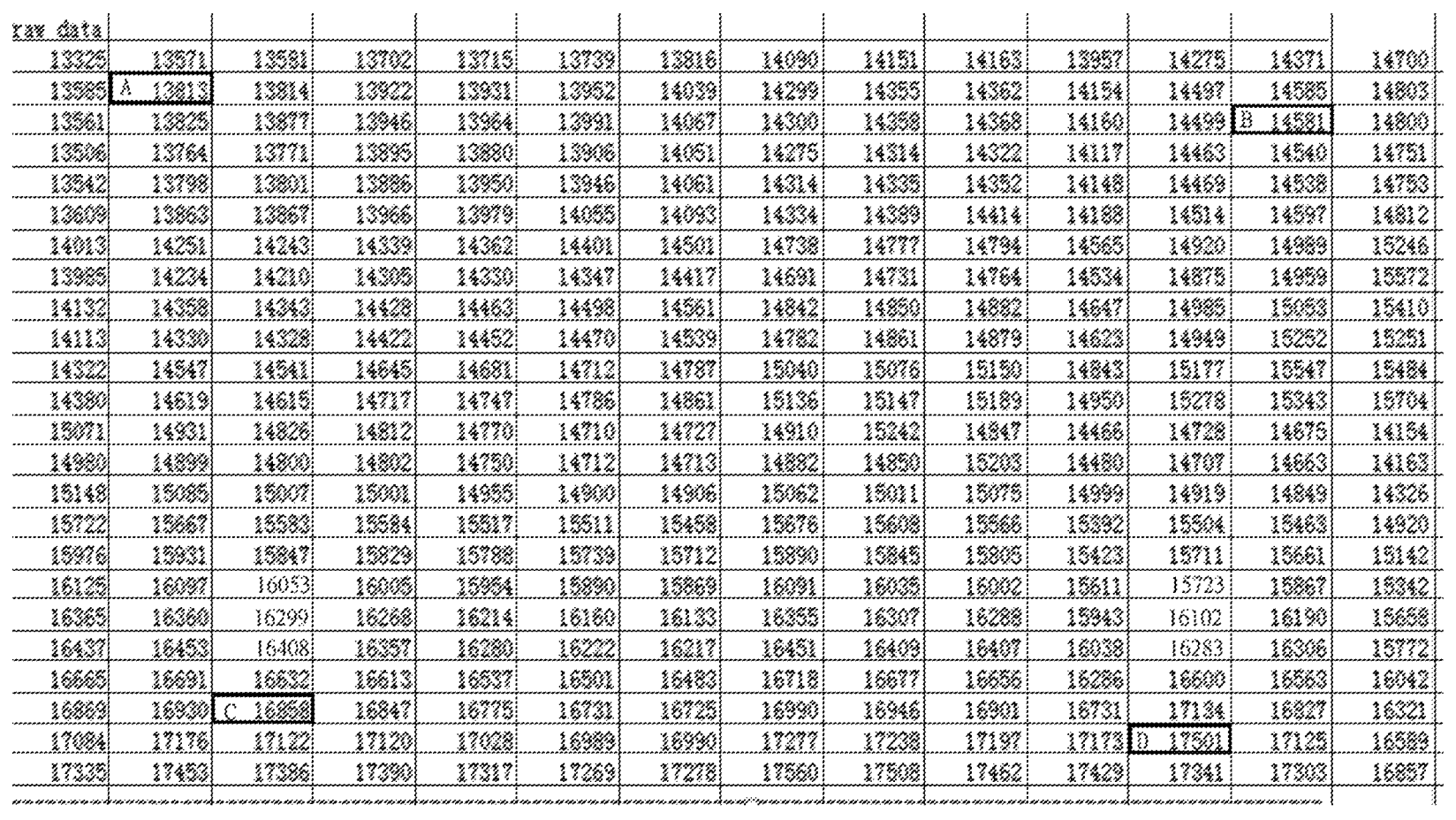

FIG. 4 is a schematic diagram of a fourth configuration of temperature monitoring nodes in an embodiment of the present disclosure; as shown in FIG. 4, in the present embodiment, the capacitance nodes located at the top left corner, the bottom left corner, the top right corner, and the bottom right corner in the touch array of the touch screen are respectively used as the temperature monitoring nodes, and a total of 4 temperature monitoring nodes (A, B, C, D). The configuration of the temperature monitoring nodes in the present embodiment is applicable to a case where the top left corner, the bottom left corner, the top right corner, and the bottom right corner of the touch screen may not be touched or approached by the user during operation, or during the normal operation of the user, there may not be excessive edge touch.

Further, referring to FIG. 4, the four temperature monitoring nodes are misplaced, that is, they are located at different rows and columns, or also referred to as different horizontal and vertical axes, which is especially suitable for application scenarios where the touch screen is large and the capacitance nodes on the edges are often touched or approached, so as to truly feedback a global change in temperature.

If the drive channels are in the vertical direction and the detection channels are in the horizontal direction, the temperature monitoring node A located at the top left corner and the temperature monitoring node C located at the bottom left corner correspond to different drive channels; the temperature monitoring node B located at the top right corner and the temperature monitoring node D located at the bottom right corner correspond to different drive channels; the temperature monitoring node located at the top left corner and the temperature monitoring node located at the top right corner correspond to different detection channels; and the temperature monitoring node located at the bottom left corner and the temperature monitoring node located at the bottom right corner correspond to different detection channels.

After the configuration of the temperature monitoring nodes is completed according to any one of the above FIG. 1 to FIG. 4, the temperature status is determined, and a detailed implementation example thereof is described below.

FIG. 5 is a schematic flowchart of a method for determining a temperature status of a touch screen according to an embodiment of the present disclosure; as shown in FIG. 5, the method includes:

S501, determining, based on a plurality of sampled characteristic values of each temperature monitoring node in each sampling period, a raw characteristic value of the temperature monitoring node in the sampling period.

In the present embodiment, the temperature monitoring node is selected from a plurality of capacitance nodes in the touch array. For details, please refer to the descriptions in FIG. 1 to FIG. 4.

In the present embodiment, in the specific step S501, when calculating the raw characteristic value of each temperature monitoring node in each sampling period, based on the plurality of sampled characteristic values of the temperature monitoring node in the sampling period, specifically, the plurality of sampled characteristic values of each temperature monitoring node in each sampling period may be summed to calculate the raw characteristic value of the temperature monitoring node in the sampling period. In a specific application, the sampling period and the number of sampled characteristic values may be set flexibly.

In the present embodiment, the size of a raw characteristic value reflects the change size of a capacitance of a capacitance node before and after the touch screen is touched or approached.

S502, calculating, based on raw characteristic values of all temperature monitoring nodes in each sampling period, a raw characteristic statistic value in each sampling period, and determining the temperature status of the touch screen based on raw characteristic statistic values in sampling periods.

In the present embodiment, in the specific step S502, when calculating the raw characteristic statistic value in each sampling period based on the raw characteristic values of all the temperature monitoring nodes in each sampling period, the raw characteristic values of all the temperature monitoring nodes in each sampling period may be preprocessed to obtain the raw characteristic statistic value in each sampling period based on preprocessed raw characteristic values.

Figure 6:
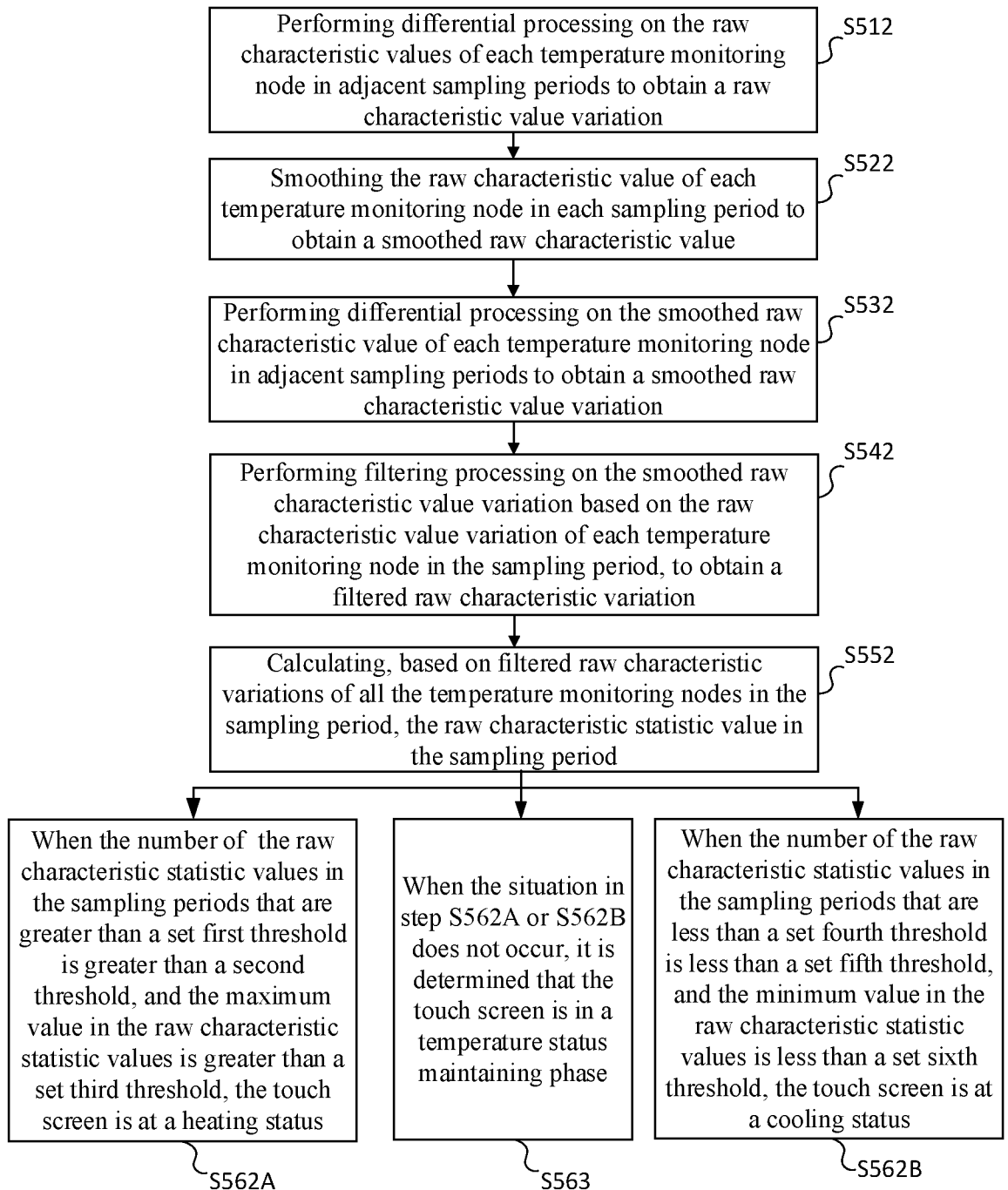
FIG. 6 is an exemplary schematic flowchart of step S502 in FIG. 5.

FIG. 6 is an exemplary schematic flowchart of step S502 in FIG. 5; as shown in FIG. 6, when preprocessing the raw characteristic values of all the temperature monitoring nodes in each sampling period to obtain the raw characteristic statistic value in each sampling period based on the preprocessed raw characteristic values, the preprocessing may specifically include differential processing for adjacent raw characteristic values, smoothing for a raw characteristic value, filtering for a smoothed raw characteristic value variation, and the like. However, it should be noted that the preprocessing does not always need to include the differential processing for adjacent raw characteristic values, smoothing for a raw characteristic value, and filtering for a smoothed raw characteristic value variation. Only one of the above may be selected based on the data validity. Of course, other preprocessing operations may also be included.

In the present embodiment, the preprocessing may specifically include differential processing for adjacent raw characteristic values, smoothing for a raw characteristic value, filtering for a smoothed raw characteristic value variation as examples, and the details thereof include the following steps:

S512, performing differential processing on the raw characteristic values of each temperature monitoring node in adjacent sampling periods to obtain a raw characteristic value variation;

In the present embodiment, as described above, in order to ensure the accuracy of temperature status determination, for each temperature monitoring node, a plurality of sampled characteristic values are obtained when performing characteristic value sampling in each sampling period, and the plurality of sampled characteristic values are summed to obtain the raw characteristic value in the sampling period; and when corresponding to a plurality of sampling periods, a plurality of raw characteristic values may be obtained, and the number of sampling periods is equal to the number of the raw characteristic values. For example, for a temperature monitoring node, characteristic value sampling is performed in a sampling period to obtain 10 sampled characteristic values (or also referred to as a set of sampled characteristic values), and the 10 sampled characteristic values are summed to obtain a raw characteristic value in this sampling period; and if 5 sampling periods are to be performed, 5 sets of 10 sampled characteristic values are thus obtained, and since 10 sampled characteristic values of each group are summed to obtain a raw characteristic value, 5 raw characteristic values may be obtained from the 5 sets of sampled characteristic values. When there are n temperature monitoring nodes, there are 5*n raw characteristic values correspondingly in the same sampling period, and the 5*n raw characteristic values form a frame of raw characteristic values.

In the present embodiment, for the $i^{th}$ temperature monitoring node, a plurality of raw characteristic values corresponding to a plurality of sampling periods are obtained after the plurality of sampling periods. In order to accurately determine the temperature status subsequently, differential processing is performed on adjacent raw characteristic values in the plurality of raw characteristic values to obtain a variation of the raw characteristic values. The variation of the raw characteristic values is denoted as RawDataDiff[i], thereby reflecting the effect of temperature changes on the raw characteristic values. Here, for the $i^{th}$ temperature monitoring node, a plurality of raw characteristic values are stored according to the sequence of the corresponding sampling periods. When performing adjacent difference on the raw characteristic values to obtain the variation of the raw characteristic values, it is only necessary to subtract the previous raw characteristic value from the post raw characteristic value. Of course, in other application scenarios, if the plurality of raw characteristic values are not stored according to the sequence of the corresponding sampling periods, then when performing adjacent difference on the raw characteristic values, it is only necessary to subtract the raw characteristic value corresponding to the previous sampling period from the raw characteristic value corresponding to the post sampling period.

S522, smoothing the raw characteristic value of each temperature monitoring node in each sampling period to obtain a smoothed raw characteristic value;

In the present embodiment, in step S522, when performing smoothing on each raw characteristic value of the $i^{th}$ temperature monitoring node, specifically, Infinite Impulse Response (IIR) smoothing may be used to obtain the smoothed raw characteristic value, that is, IIR_RawData[i].

It should be noted that, in other embodiments, mean smoothing or other smoothing processing may also be used.

S532, performing differential processing on the smoothed raw characteristic values of each temperature monitoring node in adjacent sampling periods to obtain a smoothed raw characteristic value variation;

In the present embodiment, for each temperature monitoring node, there are a plurality of raw characteristic values corresponding to a plurality of sampling periods, and then there are a plurality of smoothed raw characteristic values. If the plurality of smoothed raw characteristic values are stored according to the sequence of the corresponding sampling periods, when performing adjacent difference on the raw characteristic value variation to obtain a smoothed raw characteristic value variation, it is only necessary to subtract the previous raw characteristic value variation from the post raw characteristic value variation. For the $i^{th}$ temperature monitoring node, its corresponding smoothed raw characteristic value variation is denoted as IIR_RawData_Diff[i]. Of course, in other application scenarios, if a plurality of raw characteristic value variations are not stored according to the sequence of the corresponding sampling periods, then when differential processing on the adjacent raw characteristic value variations is performed, it is only necessary to subtract the smoothed raw characteristic value variation corresponding to the previous sampling period from the smoothed raw characteristic value variation corresponding to the post sampling period.

S542, performing filtering processing on the smoothed raw characteristic value variation based on the raw characteristic value variation of each temperature monitoring node in the sampling period, to obtain a filtered raw characteristic variation;

In the present embodiment, in order to implement the filtering processing in step S542, three filtering parameters α, β, γ are configured in advance based on empirical values for collaborative filtering processing, and the sizes of α, β, γ are respectively used to distinguish whether the variation is caused by touch or temperature change. Specifically, filtering is performed according to the following formula:

$$F\_IIR\_RawData\_Diff[i]\begin{cases} IIR\_RawData\_Diff[i] & \text{if } abs(RawDatadiff(i)) \le \alpha \\ \dfrac{IIR\_RawData\_Diff[i]}{3} & \text{if } \alpha < abs(RawDatadiff(i)) \le \beta^{-1} \\ 0 & \text{if } abs(RawDatadiffdiff(i)) > \gamma \end{cases}$$

Here, F_IIR_RawData_Diff [i] represents the filtered raw characteristic variation corresponding to the $i^{th}$ temperature monitoring node, RawDatadiff(i) represents the raw characteristic variation corresponding to the $i^{th}$ temperature monitoring node, and IIR_RawData_Diff[i] represents the smoothed raw characteristic variation corresponding to the $i^{th}$ temperature monitoring node.

S552, calculating, based on filtered raw characteristic variations of all the temperature monitoring nodes in the sampling period, the raw characteristic statistic value in the sampling period.

In the present embodiment, the filtered raw characteristic variations of all the temperature monitoring nodes in each sampling period are summed, and the result of the summing processing is used as the raw characteristic statistic value in the sampling period. For example, as described above, if the temperature monitoring nodes are configured as shown in FIG. 4, in one sampling period, each temperature monitoring node corresponds to a filtered raw characteristic variation, and four temperature monitoring nodes correspond to four filtered raw characteristic variations in total. The four filtered raw characteristic variations are summed to obtain the raw characteristic statistic value in the sampling period.

S562A: when the number of the raw characteristic statistic values in the sampling periods that are greater than a set first threshold is greater than a second threshold, and the maximum value in the raw characteristic statistic values is greater than a set third threshold, the touch screen is at a heating status.

In the present embodiment, if the raw characteristic statistic value corresponding to the temperature monitoring node in the touch screen is considered to be proportional to the temperature change, that is, the higher the temperature, the greater the raw characteristic statistic value, and in contract, the lower the temperature, the less the raw characteristic statistic value. At the same time, considering the different phases of the heating status, the raw characteristic statistic value show different changing trends. For example, when the temperature of the touch screen approaches a target temperature, the change of the raw characteristic statistic value is relatively stable, however, before approaching the target temperature from a low temperature status, the change of the raw characteristic statistic value is dramatic, and correspondingly, the greater the number of the raw characteristic statistic values that are greater than the set first threshold. When the number is greater than the second threshold, and the maximum value in the raw characteristic statistic value is constantly refreshed and greater than the set third threshold, the touch screen is at a heating status. In the present embodiment, the first threshold, the second threshold, and the third threshold are set based on the influence of the heating process on the raw characteristic statistic value.

Further, in the present embodiment, in order to represent the number of the raw characteristic statistic value that are greater than the set first threshold, a first count parameter upcount is set. When the situation that the raw characteristic statistic value is greater than the set first threshold occurs for one time, the value of upcount is increased by one. In addition, at the heating status, considering that the capacitance node is affected by the temperature, the raw characteristic statistic value may gradually increase. Therefore, the raw characteristic statistic value may change constantly after each sampling period. Here, the maximum value in the raw characteristic statistic value may be constantly refreshed.

S562B, when the number of the raw characteristic statistic values in the sampling periods that are less than a set fourth threshold is less than a set fifth threshold, and the minimum value in the raw characteristic statistic values is less than a set sixth threshold, the touch screen is at a cooling status.

In the present embodiment, if the raw characteristic statistic value corresponding to the temperature monitoring node of the touch screen is considered to be proportional to the temperature change, that is, the higher the temperature, the greater the raw characteristic statistic value, and in contract, the lower the temperature, the less the raw characteristic statistic value. At the same time, considering the different phases of the heating status, the raw characteristic statistic value show different changing trends. For example, when the temperature of the touch screen approaches a target temperature, the change of the raw characteristic statistic value is relatively stable, however, before approaching the target temperature from a high temperature status, the change of the raw characteristic statistic value is dramatic, and correspondingly, the greater the number of the raw characteristic statistic value that are less than the set fourth threshold. When the number less than the fifth threshold, and the minimum value in the raw characteristic statistic value is constantly refreshed and less than the set sixth threshold, the touch screen is at a cooling status. In the present embodiment, the fourth threshold, the fifth threshold, and the sixth threshold are set based on the influence of the cooling process on the raw characteristic statistic value.

Further, in the present embodiment, in order to represent the number of the raw characteristic statistic values that are less than the set fourth threshold, a second count parameter dncount is set. When the situation that the raw characteristic statistic value is less than the set fourth threshold occurs for one time, the value of dncount is increased by one. In addition, at the cooling status, considering that the capacitance node is affected by the temperature, the raw characteristic statistic value may gradually become less. Therefore, the raw characteristic statistic value may change constantly after each sampling period. Here, the minimum value in the raw characteristic statistic value may be constantly refreshed.

S563, when the situation in step S562A or S562B does not occur, it is determined that the touch screen is in a temperature status maintaining phase.

Figure 7:
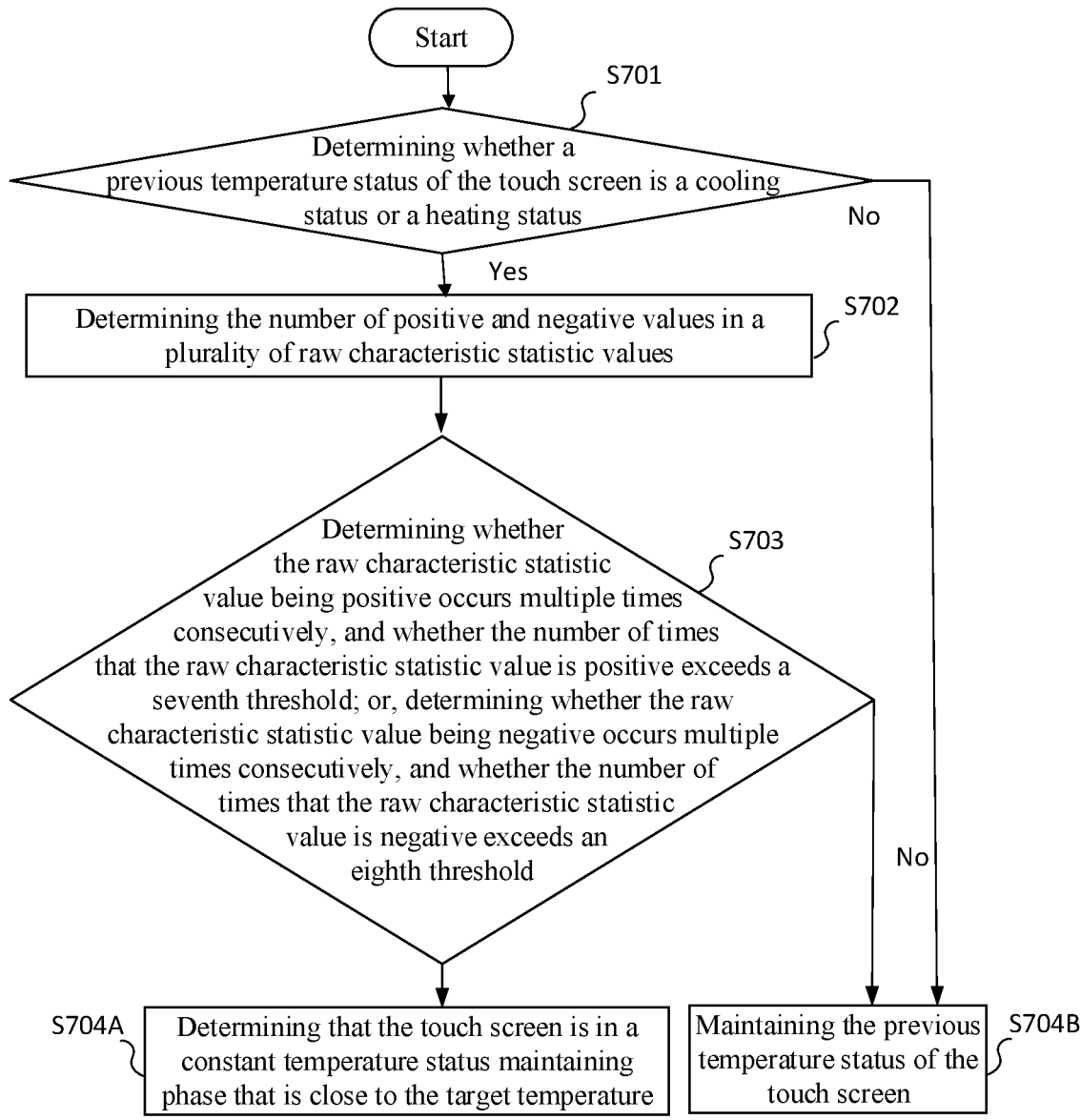
FIG. 7 is a schematic flowchart of determining that the touch screen is in a temperature status maintaining phase according to an embodiment of the present disclosure.

FIG. 7 is a schematic flowchart of determining that the touch screen is in a temperature status maintaining phase according to an embodiment of the present disclosure;

as shown in FIG. 7, it includes:

S701, determining whether a previous temperature status of the touch screen is a cooling status or a heating status; if yes, perform step SS702; otherwise, perform step S704B;

S702, determining the number of positive and negative values in a plurality of raw characteristic statistic values;

In the present embodiment, the number of raw characteristic statistic value may be flexibly set according to the application scenario. For example, after the current sampling period in the embodiment in FIG. 5 described above, a plurality of sampling periods may be performed consecutively in sequence to obtain the corresponding a plurality of raw characteristic statistic value.

In the present embodiment, in order to count the number of positive and negative values, a positive value statistical parameter (denoted as Poscount) and a negative value statistical parameter (Negcount) are respectively set, at each occurrence of a positive raw characteristic statistic value, the positive value statistical parameter Poscount is increased by 1, and at each occurrence of a negative raw characteristic statistic value, the negative value statistical parameter Negcount is increased by 1.

S703, determining whether the raw characteristic statistic value being positive occurs multiple times consecutively, and whether the number of times that the raw characteristic statistic value is positive exceeds a seventh threshold; or, determining whether the raw characteristic statistic value being negative occurs multiple times consecutively, and whether the number of times that the raw characteristic statistic value is negative exceeds an eighth threshold;

if any one of above occurs, step S704A is performed; otherwise, step S704B is performed;

In the present embodiment, the seventh threshold is set according to change experience of the raw characteristic statistic value in the cooling process. The eighth threshold is set according to change experience of the raw characteristic statistic value in the heating process.

S704A, when the raw characteristic statistic value being positive occurs multiple times consecutively, and whether the number of times that the raw characteristic statistic value is positive exceeds the seventh threshold, and the previous temperature status of the touch screen is a cooling status, or, when the raw characteristic statistic value being negative occurs multiple times consecutively, and whether the number of times that the raw characteristic statistic value is negative exceeds the eighth threshold, determining that the touch screen is in a constant temperature status maintaining phase that is close to the target temperature; otherwise, performing step S704B.

S704B, maintaining the previous temperature status of the touch screen.

For example, in step S702, if there are 10 raw characteristic statistic value, the seventh threshold and the eighth threshold may be respectively set to 4, that is, equivalent to assuming that in the cooling process, more raw characteristic statistic value are negative, and once the number of raw characteristic statistic value being positive is close to the number of raw characteristic statistic value being negative, it indicates that the touch screen is about to complete the cooling process and is approaching the target temperature; and in the heating process, more raw characteristic statistic value are positive, and once the number of raw characteristic statistic value being negative is close to the number of raw characteristic statistic value being positive, it indicates that the touch screen is about to complete the heating process and is approaching the target temperature. If more raw characteristic statistic value being negative continues, and the number of raw characteristic statistic value being positive is not close to the number of raw characteristic statistic value being negative, it indicates that the touch screen is still in the cooling process, that is, the previous temperature status of the touch screen is maintained; and in the heating process, more raw characteristic statistic value being positive continues, and the number of raw characteristic statistic value being negative is not close to the number of raw characteristic statistic value being positive, it indicates that the touch screen is still in the heating process, that is, the previous temperature status of the touch screen is maintained.

Figure 8:
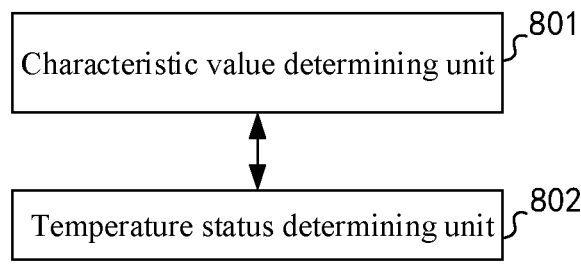
FIG. 8 is a schematic structural diagram of an apparatus for determining a temperature status of a touch screen according to an embodiment of the present disclosure.

FIG. 8 is a schematic structural diagram of an apparatus for determining a temperature status of a touch screen according to an embodiment of the present disclosure; as shown in FIG. 8, the apparatus includes:

a characteristic value determining unit 801, configured to determine, based on a plurality of sampled characteristic values of each temperature monitoring node in each sampling period, a raw characteristic value of the temperature monitoring node in the sampling period, the temperature monitoring node being selected from a plurality of capacitance nodes in a touch array; and a temperature status determining unit 802, configured to calculate, based on raw characteristic values of all temperature monitoring nodes in each sampling period, a raw characteristic statistic value in each sampling period, and determine the temperature status of the touch screen based on raw characteristic statistic values in sampling periods.

An embodiment of the present disclosure provides a touch chip, including the apparatus for determine a temperature status of a touch screen according to any one of the embodiments of the present disclosure.

An embodiment of the present disclosure provides an electronic device, including the touch chip according to any one of the embodiments of the present disclosure.

The electronic device in the embodiments of the present disclosure takes in various forms, including but not limited to:

(1) Mobile communication device: this type of device is characterized by mobile communication function, and its main goal is to provide voice and data communication. Such terminals include: smart phones (such as iPhone), multimedia cellphones, feature cellphones, low-end cellphones or the like.

(2) Ultra-mobile personal computer device: this type of device belongs to the category of personal computer, has computing and processing functions, and generally also has mobile Internet access characteristics. Such terminals include: PDAs, MIDs, and UMPC devices, such as iPad.

(3) Portable entertainment equipment: this type of device may display and play multimedia content. Such devices include: audio and video players (such as iPod), hand-held game consoles, e-books, smart toys and portable vehicle-mounted navigation devices.

(4) Server: equipment that provides computing services. The server includes a processor 810, hard disk, memory, system bus, etc. The server is similar in architecture to a general-purpose computer. However, due to the need to provide highly reliable services, the server has high requirements in terms of processing power, stability, reliability, security, scalability, and manageability.

(5) Other electronic apparatuses having data interaction functions.

So far, specific embodiments of the present subject matter have been described. Other embodiments are within the scope of the appended claims. In some cases, the actions recited in the claims may be performed in a different order and still achieve the desired result. In addition, the processes depicted in the accompanying drawings do not necessarily require the particular order or sequential order shown to achieve the desired result. In some embodiments, multitasking and parallel processing may be advantageous.

In the 1990s, for a technical improvement, it can be clearly distinguished whether it is an improvement in hardware (for example, an improvement in circuit structures such as diodes, transistors, or switches) or an improvement in software (an improvement on method flow). However, with the development of technology, nowadays, many method flow improvements may be regarded as direct improvements in the hardware circuit structure. Designers mostly always get the corresponding hardware circuit structure by programming the improved method flow into the hardware circuit. Therefore, it cannot be said that an improvement on the method flow cannot be realized by a hardware entity module. For example, a programmable logic device (PLD) (such as a Field Programmable Gate Array (FPGA)) is such an integrated circuit whose logic function is determined by the user programming the device. Designers themselves may program to "integrate" a digital system on a piece of PLD, without having to ask a chip manufacturer to design and manufacture a dedicated integrated circuit chip. Moreover, nowadays, instead of manufacturing integrated circuit chips manually, this programming is also mostly implemented using "logic compiler" software, which is similar to the software compiler used in program development and writing. To compile the original source code, it have to be written in a specific programming language, which is called Hardware Description Language (HDL). There is not only one type of HDL, but many types, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, or RHDL (Ruby Hardware Description Language). Currently the most commonly used are VHDL (Very-High-Speed Integrated Circuit Hardware Description Language) and Verilog. Those skilled in the art should also be clear that as long as the method flow is slightly logical programmed and programmed into the integrated circuit using the above-mentioned several hardware description languages, a hardware circuit that implements the logic method flow may be easily obtained.

A controller may be implemented in any suitable method, for example, the controller may take the form of a microprocessor or processor and a computer-readable medium storing computer-readable program codes (such as software or firmware) executable by the (micro) processor, logic gate, switch, application specific integrated circuit (ASIC), programmable logic controller, and embedded microcontroller. Examples of controllers include, but are not limited to, the following microcontrollers: ARC 625D, Atmel AT91SAM, Microchip PIC18F26K20 and Silicone Labs C8051F320. A memory controller may also be implemented as part of the control logic for the memory. Those skilled in the art also know that, in addition to implementing the controller in the purely computer-readable program code method, it is entirely possible to logical program method steps to make the controller achieve the same functions in the form of logic gate, switch, application specific integrated circuit, programmable logic controller, and embedded microcontroller. Therefore, such controller may be regarded as a hardware component, and an apparatus for implementing various functions included in the controller may also be regarded as a structure within the hardware component. Or even, the apparatus for implementing various functions may be regarded as a structure that may be both a software module implementing the method and a hardware component.

The system, apparatus, module, or unit described in the foregoing embodiments may be specifically implemented by a computer chip or entity, or by a product having a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when describing the above apparatus, the functions are divided into various units and described separately. Of course, when implementing the present disclosure, the functions of the units may be implemented in one or more software and/or hardware.

Those skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may take the form of a computer program product implemented on one or more computer-usable storage mediums (including but not limited to disk memory, CD-ROM, optical memory, etc.) containing computer-usable program codes.

The present disclosure is described with reference to flowcharts and/or block diagrams of the method, device (system), and computer program product according to the embodiments of the present disclosure. It should be understood that each flow and/or block in the flowcharts and/or block diagrams, and combinations of flows and/or blocks in the flowcharts and/or block diagrams may be implemented by computer program instructions. These computer program instructions may be provided to a processor of a general-purpose computer, dedicated computer, embedded processor, or other programmable data processing device to produce a machine, such that instructions executed by the processor of the computer or other programmable data processing device produce an apparatus for implementing the functions specified in one or more flows in the flowcharts and/or one or more blocks in the block diagrams.

These computer program instructions may also be stored in a computer-readable memory capable of directing the computer or other programmable data processing device to work in a specific method such that the instructions stored in the computer-readable memory produce a product that includes an instruction apparatus that implements the functions specified in one or more flows in the flowcharts and/or one or more blocks in the block diagrams.

These computer program instructions may also be loaded onto the computer or other programmable data processing device, such that a series of operation steps may be performed on the computer or other programmable device to produce a computer-implemented process, such that the instructions executed on the computer or other programmable device provide steps for implementing the functions specified in one or more flows in the flowcharts and/or one or more blocks in the block diagrams.

In a typical configuration, a computing device includes one or more processors (CPUs), input/output interfaces, network interfaces, and memories.

Memory may include non-persistent memory, random access memory (RAM), and/or non-volatile memory in computer-readable medium, such as read-only memory (ROM) or flash read-only memory (flash RAM). Memory is an example of the computer-readable medium.

Computer-readable medium includes both permanent and non-persistent, removable and non-removable media. Information may be stored by any method or technology. Information may be computer-readable instructions, data structures, program modules, or other data. Examples of computer storage mediums include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only disc read-only memory (CD-ROM), digital versatile disc (DVD) or other optical storage, magnetic tape cartridges, magnetic tape, magnetic disk storage or other magnetic storage devices, or any other non-transmission medium that may be used to store information that can be accessed by the computing device. As defined herein, the computer-readable medium does not include temporary computer-readable media (transitory media) such as modulated data signals and carrier waves.

It should also be noted that the terms "including", "comprising," or any other variation thereof are intended to encompass non-exclusive inclusion, such that a process, method, product, or device that includes a series of elements includes not only those elements but also other elements not explicitly listed, or those that are inherent to such process, method, product, or device. Without more restrictions, the elements defined by the sentence "including a . . . " do not exclude the existence of other identical elements in the process, method, product or device including the said elements.

Those skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects.

Moreover, the present disclosure may take the form of a computer program product implemented on one or more computer-usable storage mediums (including but not limited to disk memory, CD-ROM, optical memory, etc.) containing computer-usable program codes.

The present disclosure may be described in the general context of computer-executable instructions executed by the computer, such as program modules. Generally, program modules include routines, programs, objects, components, data structures, etc. that perform specific transactions or implement specific abstract data types. The present disclosure may also be practiced in distributed computing environments in which transactions are performed by remote processing devices connected through communication networks. In a distributed computing environment, program modules may be located at local and remote computer storage mediums, including storage devices.

The embodiments in this specification are described in a progressive method, and the same or similar parts between the embodiments may refer to each other. Each embodiment focuses on the differences from other embodiments. Specifically, for the system embodiment, since it is basically similar to the method embodiment, the description thereof is relatively simple. For relevant parts, it may refer to the description of the method embodiment.

The above description is merely embodiments of the present disclosure and is not intended to limit the present disclosure. For those skilled in the art, the present disclosure may have various modifications and changes. Any modification, equivalent replacement, improvement, etc. made within the spirit and principle of the present disclosure shall be included in the scope of the claims of the present disclosure.

What is claimed is:

1. A method for determining a temperature status of a touch screen, comprising:
    determining, based on a plurality of sampled characteristic values of each temperature monitoring node in each sampling period, a raw characteristic value of the temperature monitoring node in the sampling period, the temperature monitoring node being selected from a plurality of capacitance nodes in a touch array; and
    calculating, based on raw characteristic values of all temperature monitoring nodes in each sampling period, a raw characteristic statistic value in each sampling period, and determining the temperature status of the touch screen based on raw characteristic statistic values in sampling periods,
    wherein the determining the temperature status of the touch screen based on the raw characteristic statistic values in the sampling periods, comprises:
        determining, among of the raw characteristic statistic values in the sampling periods, first raw characteristic statistic values and second raw characteristic statistic values, the first raw characteristic statistic values being greater than a first threshold and the second raw characteristic statistic values being less than a fourth threshold;
        when a number of the first raw characteristic statistic values is greater than a second threshold, and a maximum value in the raw characteristic statistic values in the sampling periods is greater than a third threshold, determining that the touch screen is at a temperature-rising status; and
        when a number of the second raw characteristic statistic values is less than a fifth threshold, and a minimum value in the raw characteristic statistic values in the sampling periods is less than a sixth threshold, determining that the touch screen is at a temperature-falling status.

2. The method according to claim 1, wherein, the calculating, based on a plurality of sampled characteristic values of each temperature monitoring node in each sampling period, a raw characteristic value of the temperature monitoring node in the sampling period, comprises: summing the plurality of sampled characteristic values of the temperature monitoring node in the sampling period to calculate the raw characteristic value of the temperature monitoring node in the sampling period.

3. The method according to claim 2, wherein, the temperature monitoring node is selected from capacitance nodes located at a top left corner, a bottom left corner, a top right corner, and a bottom right corner of the touch array of the touch screen.

4. The method according to claim 1, wherein, the calculating, based on raw characteristic values of all temperature monitoring nodes in each sampling period, a raw characteristic statistic value in each sampling period, comprises: preprocessing the raw characteristic values of all the temperature monitoring nodes in each sampling period, and obtaining the raw characteristic statistic value in each sampling period based on preprocessed raw characteristic values.

5. The method according to claim 4, wherein, the temperature monitoring node is selected from capacitance nodes located at a top left corner, a bottom left corner, a top right corner, and a bottom right corner of the touch array of the touch screen.

6. The method according to claim 4, wherein, the preprocessing the raw characteristic values of all the temperature monitoring nodes in each sampling period, and obtaining the raw characteristic statistic value in each sampling period based on preprocessed raw characteristic values, comprises:
    performing differential processing on the raw characteristic values of each temperature monitoring node in adjacent sampling periods to obtain a raw characteristic value variation; and
    calculating, based on raw characteristic value variations of all the temperature monitoring nodes in each sampling period, the raw characteristic statistic value in the sampling period.

7. The method according to claim 6, wherein, the temperature monitoring node is selected from capacitance nodes located at a top left corner, a bottom left corner, a top right corner, and a bottom right corner of the touch array of the touch screen.

8. The method according to claim 4, wherein, the preprocessing the raw characteristic values of all the temperature monitoring nodes in each sampling period, and obtaining the raw characteristic statistic value in each sampling period based on preprocessed raw characteristic values, comprises:
    smoothing the raw characteristic value of each temperature monitoring node in each sampling period to obtain a smoothed raw characteristic value;
    performing differential processing on the smoothed raw characteristic values of each temperature monitoring node in adjacent sampling periods to obtain a smoothed raw characteristic value variation; and
    calculating, based on the raw characteristic value variation and the smoothed raw characteristic value variation of each temperature monitoring node in each sampling period, the raw characteristic statistic value in the sampling period.

9. The method according to claim 8, wherein, the temperature monitoring node is selected from capacitance nodes located at a top left corner, a bottom left corner, a top right corner, and a bottom right corner of the touch array of the touch screen.

10. The method according to claim 8, wherein, the calculating, based on the raw characteristic value variation and the smoothed raw characteristic value variation of each temperature monitoring node in each sampling period, the raw characteristic statistic value in the sampling period, comprises:
performing filtering processing on the smoothed raw characteristic value variation based on the raw characteristic value variation of each temperature monitoring node in the sampling period, to obtain a filtered raw characteristic variation; and
calculating, based on filtered raw characteristic variations of all the temperature monitoring nodes in the sampling period, the raw characteristic statistic value in the sampling period.

11. The method according to claim 10, wherein, the temperature monitoring node is selected from capacitance nodes located at a top left corner, a bottom left corner, a top right corner, and a bottom right corner of the touch array of the touch screen.

12. The method according to claim 1, wherein, the temperature monitoring node is selected from capacitance nodes located at a top left corner, a bottom left corner, a top right corner, and a bottom right corner of the touch array of the touch screen.

13. The method according to claim 12, wherein, the temperature monitoring node located at the top left corner and the temperature monitoring node located at the bottom left corner correspond to different drive channels; the temperature monitoring node located at the top right corner and the temperature monitoring node located at the bottom right corner correspond to different drive channels; the temperature monitoring node located at the top left corner and the temperature monitoring node located at the top right corner correspond to different detection channels; and the temperature monitoring node located at the bottom left corner and the temperature monitoring node located at the bottom right corner correspond to different detection channels.

14. The method according to claim 12, wherein, the temperature monitoring node is further selected from a capacitance node at a middle position of the touch array of the touch screen.

15. The method according to claim 14, wherein, the temperature monitoring node located at the top left corner and the temperature monitoring node located at the bottom left corner correspond to same drive channel; the temperature monitoring node located at the top right corner and the temperature monitoring node located at the bottom right corner correspond to same drive channel; the temperature monitoring node located at the top left corner and the temperature monitoring node located at the top right corner correspond to same detection channel; and the temperature monitoring node located at the bottom left corner and the temperature monitoring node located at the bottom right corner correspond to same detection channel.

16. The method according to claim 12, wherein, the temperature monitoring node is selected from capacitance nodes in a direction of a drive channel or a direction of a detection channel in the touch array of the touch screen.

17. An apparatus for determining a temperature status of a touch screen, comprising:
a characteristic value determining unit, configured to determine, based on a plurality of sampled characteristic values of each temperature monitoring node in each sampling period, a raw characteristic value of the temperature monitoring node in the sampling period, the temperature monitoring node being selected from a plurality of capacitance nodes in a touch array; and
a temperature status determining unit, configured to calculate, based on raw characteristic values of all temperature monitoring nodes in each sampling period, a raw characteristic statistic value in each sampling period, and determine the temperature status of the touch screen based on raw characteristic statistic values in sampling periods,
wherein the determining the temperature status of the touch screen based on the raw characteristic statistic values in the sampling periods, comprises:
determining, among of the raw characteristic statistic values in the sampling periods, first raw characteristic statistic values and second raw characteristic statistic values, the first raw characteristic statistic values being greater than a first threshold and the second raw characteristic statistic values being less than a fourth threshold;
when a number of the first raw characteristic statistic values is greater than a second threshold, and a maximum value in the raw characteristic statistic values in the sampling periods is greater than a third threshold, determining that the touch screen is at a temperature-rising status; and
when a number of the second raw characteristic statistic values is less than a fifth threshold, and a minimum value in the raw characteristic statistic values in the sampling periods is less than a sixth threshold, determining that the touch screen is at a temperature-falling status.

18. A touch chip, comprising the apparatus for determining a temperature status of a touch screen, wherein the apparatus comprising:
a characteristic value determining unit, configured to determine, based on a plurality of sampled characteristic values of each temperature monitoring node in each sampling period, a raw characteristic value of the temperature monitoring node in the sampling period, the temperature monitoring node being selected from a plurality of capacitance nodes in a touch array; and
a temperature status determining unit, configured to calculate, based on raw characteristic values of all temperature monitoring nodes in each sampling period, a raw characteristic statistic value in each sampling period, and determine the temperature status of the touch screen based on raw characteristic statistic values in sampling periods,
wherein the determining the temperature status of the touch screen based on the raw characteristic statistic values in the sampling periods, comprises:
determining, among of the raw characteristic statistic values in the sampling periods, first raw characteristic statistic values and second raw characteristic statistic values, the first raw characteristic statistic values being greater than a first threshold and the second raw characteristic statistic values being less than a fourth threshold;
when a number of the first raw characteristic statistic values is greater than a second threshold, and a maximum value in the raw characteristic statistic values in the sampling periods is greater than a third threshold, determining that the touch screen is at a temperature-rising status; and when a number of the second raw characteristic statistic values is less than a fifth threshold, and a minimum value in the raw characteristic statistic values in the sampling periods is less than a sixth threshold, determining that the touch screen is at a temperature-falling status.

* * * * *